United States Patent
Telang et al.

(10) Patent No.: US 9,565,546 B2
(45) Date of Patent: Feb. 7, 2017

(54) ENHANCED SYSTEM ACQUISITION WHILE ROAMING

(71) Applicant: QUALCOMM Incorporated, San Diego, CA (US)

(72) Inventors: Mahesh Devdatta Telang, San Diego, CA (US); Ameya Rajendraprasad Kasbekar, San Diego, CA (US); Rohit Kumar Maharana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/788,212

(22) Filed: Jun. 30, 2015

(65) Prior Publication Data

US 2016/0262004 A1 Sep. 8, 2016

Related U.S. Application Data

(60) Provisional application No. 62/128,429, filed on Mar. 4, 2015.

(51) Int. Cl.
*H04W 8/02* (2009.01)
*H04W 48/16* (2009.01)
*H04W 48/18* (2009.01)

(52) U.S. Cl.
CPC .............. *H04W 8/02* (2013.01); *H04W 48/18* (2013.01); *H04W 48/16* (2013.01)

(58) Field of Classification Search
CPC ......... H04W 8/02; H04W 48/16; H04W 48/18
(Continued)

(56) References Cited

U.S. PATENT DOCUMENTS 8,565,221 B2 10/2013 Kodali et al.
2002/0147012 A1 10/2002 Leung et al.
(Continued)

FOREIGN PATENT DOCUMENTS

WO WO-2014107855 A1 7/2014

OTHER PUBLICATIONS

3GPP TR 22.811: "3rd Generation Partnership Project; Technical Specification Group Services and Systems Aspects; Review of Network Selection Principles", Version 7.2.0, Release 7, Jun. 2006, pp. 15.
(Continued)

*Primary Examiner* — Michael Mapa
(74) *Attorney, Agent, or Firm* — Loza & Loza LLP

(57) ABSTRACT

Various methods, apparatus, and computer readable media are disclosed for enhanced system acquisition while a user equipment (UE) is roaming. The UE may detect roaming from a coverage area associated with a first public land mobile network (PLMN) supporting hybrid voice and data to a coverage area associated with a second PLMN without support for hybrid voice and data. In response to the detection, the UE may store data corresponding to the second PLMN such that the second PLMN is a registered PLMN (RPLMN). The UE may initiate system acquisition, wherein the system acquisition includes searching for the RPLMN prior to searching for any other PLMN. The other PLMN may include a home PLMN (HPLMN). The coverage area associated with the first PLMN may be within a first country, and the coverage area associated with the second network may be within a second country different from the first country.

26 Claims, 8 Drawing Sheets

(58) Field of Classification Search
USPC ............... 455/150.1, 432.1–445; 370/331
See application file for complete search history.

(56) References Cited

U.S. PATENT DOCUMENTS

| | | | |
|---|---|---|---|
| 2005/0037755 A1* | 2/2005 | Hind | H04W 48/18 |
| | | | 455/435.3 |
| 2005/0070284 A1 | 3/2005 | Cheng | |
| 2010/0097386 A1* | 4/2010 | Kim | G06F 9/5005 |
| | | | 345/545 |
| 2012/0083268 A1 | 4/2012 | Lung et al. | |
| 2013/0237223 A1 | 9/2013 | Hietalahti et al. | |
| 2015/0045025 A1 | 2/2015 | Lim et al. | |
| 2015/0094062 A1* | 4/2015 | Niemi | H04W 60/00 |
| | | | 455/435.2 |
| 2016/0007240 A1* | 1/2016 | Belghoul | H04W 36/0022 |
| | | | 370/331 |

OTHER PUBLICATIONS

International Search Report and Written Opinion—PCT/US2016/018785—ISA/EPO—Jun. 3, 2016.

* cited by examiner

ENHANCED SYSTEM ACQUISITION WHILE ROAMING

CROSS-REFERENCE TO RELATED APPLICATION(S)

This application claims priority to and benefit of provisional patent application No. 62/128,429 filed in the United States Patent and Trademark Office on Mar. 4, 2015, the entire content of which is incorporated herein by reference.

TECHNICAL FIELD

The technology discussed below relates generally to wireless communication and, more particularly, to system acquisition while roaming in a wireless communication network.

INTRODUCTION

Wireless communication systems are widely deployed to provide various telecommunication services such as telephony, video, data, messaging, and broadcasts. Many wireless communication technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards.

However, as the demand for mobile broadband access continues to increase, there exists a need for further improvements in LTE technology. For example, the quality of service of voice communications utilizing the packet switched LTE network remains less than that available in existing, circuit switched networks. For example, 3GPP networks such as UMTS and GSM, and networks defined by other standards bodies, such as the cdma2000 1× networks promulgated by 3GPP2, continue to be relied upon for their circuit switched voice communication capabilities.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In an aspect, the disclosure provides a method of wireless communication that includes detecting roaming from a coverage area associated with a first public land mobile network (PLMN) supporting hybrid voice and data to a coverage area associated with a second PLMN without support for hybrid voice and data. The method also includes, in response to the detecting, storing data corresponding to the second PLMN such that the second PLMN is a registered PLMN (RPLMN). The method also includes initiating system acquisition, wherein the system acquisition includes searching for the RPLMN prior to searching for any other PLMN.

In another aspect, the disclosure provides an apparatus for wireless communication, and the apparatus includes a memory, a transceiver, and at least one processor communicatively coupled to the memory and the at least one processor. The at least one processor is configured for detecting roaming from a coverage area associated with a first PLMN supporting hybrid voice and data to a coverage area associated with a second PLMN without support for hybrid voice and data. The at least one processor is also configured for storing, in response to the detecting, data corresponding to the second PLMN in the memory such that the second PLMN is an RPLMN. The at least one processor is also configured for initiating system acquisition, wherein the system acquisition includes searching for the RPLMN prior to searching for any other PLMN.

In yet another aspect, the disclosure provides another apparatus for wireless communication. The apparatus includes means for detecting roaming from a coverage area associated with a first PLMN supporting hybrid voice and data to a coverage area associated with a second PLMN without support for hybrid voice and data. The apparatus also includes means for storing, in response to the detecting, data corresponding to the second PLMN such that the second PLMN is an RPLMN. The apparatus also includes means for initiating system acquisition, wherein the system acquisition includes searching for the RPLMN prior to searching for any other PLMN.

In a further aspect, the disclosure provides a computer-readable medium that includes computer-executable instructions. The computer-executable instruction are configured for detecting roaming from a coverage area associated with a first PLMN supporting hybrid voice and data to a coverage area associated with a second PLMN without support for hybrid voice and data. The computer-executable instructions are also configured for storing, in response to the detecting, data corresponding to the second PLMN such that the second PLMN is an RPLMN. The computer-executable instructions are also configured for initiating system acquisition, wherein the system acquisition comprises searching for the RPLMN prior to searching for any other PLMN.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
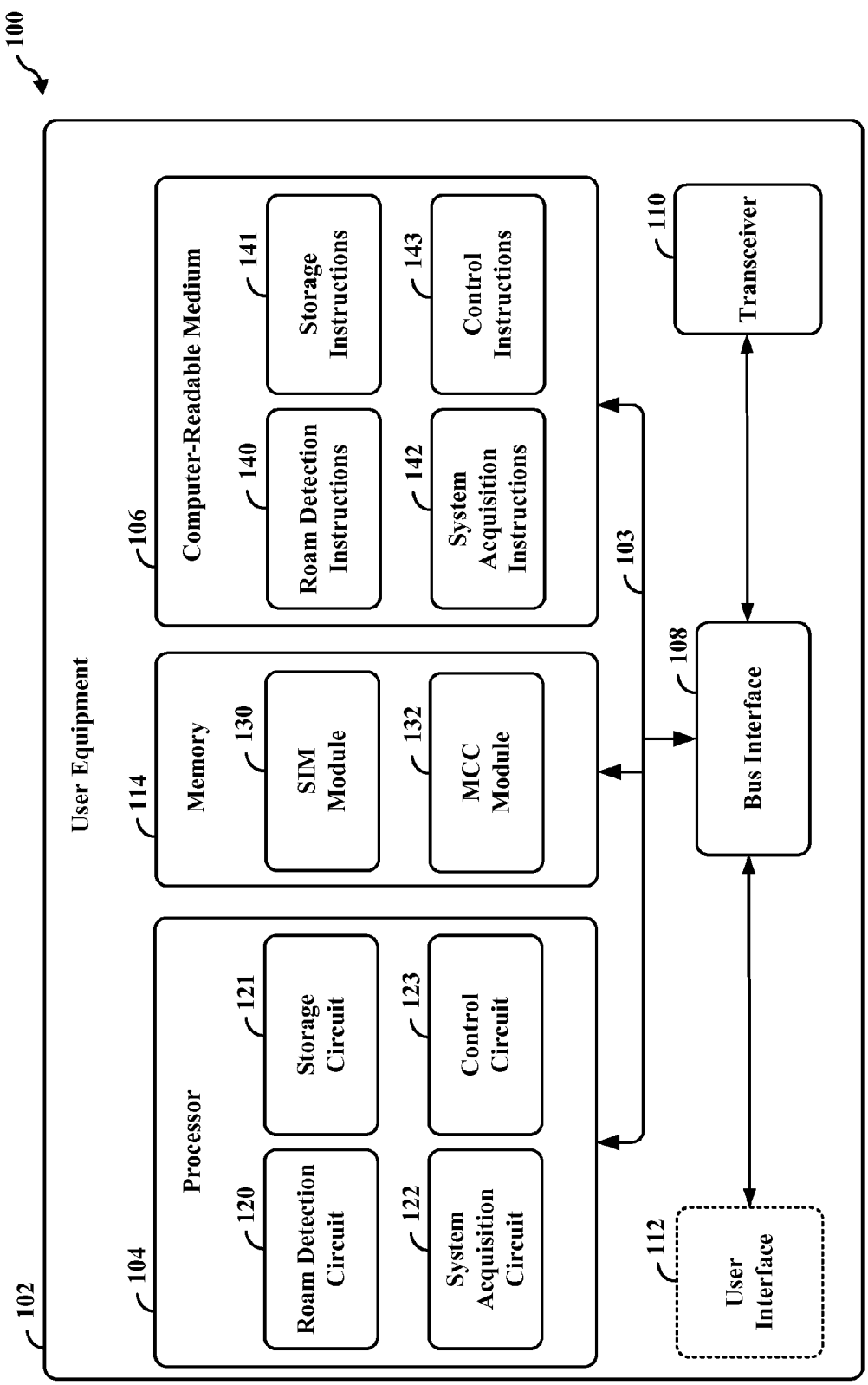
FIG. 1 is a diagram illustrating an example of a hardware implementation of a user equipment (UE).

FIG. 1 is a diagram 100 illustrating an example of a hardware implementation of a user equipment (UE) 102. In some configurations, the UE 102 may include a user interface 112. The user interface 112 may be configured to receive one or more inputs from a user of the UE 102. The user interface 112 may also be configured to display information to the user of the UE 102. The user interface 112 may exchange data to and/or from the UE 102 via the bus interface 108. The UE 102 may also include a transceiver 110. The transceiver 110 may be configured to receive data and/or transmit data in communication with another apparatus. The transceiver 110 provides a means for communicating with another apparatus via a wired and/or wireless transmission medium. The transceiver 110 may be configured to perform such communications using various types of technologies. One of ordinary skill in the art will understand that many types of technologies to perform such communication may be used without deviating from the scope of the present disclosure. The UE 102 may also include a memory 114, one or more processors 104, a computer-readable medium 106, and a bus interface 108. The bus interface 108 may provide an interface between a bus 103 and the transceiver 110. The memory 114, the one or more processors 104, the computer-readable medium 106, and the bus interface 108 may be connected together via the bus 103. The processor 104 may be communicatively coupled to the transceiver 110 and/or the memory 114.

The processor 104 may include a roam detection circuit 120, a storage circuit 121, a system acquisition circuit 122, a control circuit 123, and/or other circuits (not shown). Generally, the roam detection circuit 120, the storage circuit 121, the system acquisition circuit 122, the control circuit 123, and/or the other circuits (not shown) may, individually or collectively, include various hardware components and/or software modules that can perform and/or enable any one or more of the functions, methods, operations, processes, features and/or aspects described herein with reference to an apparatus. The roam detection circuit 120 provides the means for detecting roaming from the coverage area associated with the first PLMN supporting hybrid voice and data to the coverage area associated with the second PLMN without support for hybrid voice and data. The storage circuit 121 provides the means for storing, in response to the detection, data corresponding to the second PLMN such that the second PLMN is the RPLMN. The system acquisition circuit 122 provides the means for initiating system acquisition, wherein system acquisition may include searching for the RPLMN prior to searching for any other PLMN.

In some configurations, the control circuit 123 provides the means for comparing information associated with the second PLMN with stored information associated with PLMNs that support hybrid voice and data. In such configurations, the control circuit 123 also provides the means for determining that the second PLMN is without support for hybrid voice and data when the information associated with the second PLMN does not match the stored information associated with the PLMNs that support hybrid voice and data. In some configurations, the control circuit 123 also provides the means for switching communication from hybrid voice and data to circuit-switched fallback (CSFB) after determining that the second PLMN is without support for hybrid voice and data.

The foregoing description provides a non-limiting example of the processor 104 of the UE 102. Although various circuits have been described above, one of ordinary skill in the art will understand that the processor 104 may also include various other circuits (not shown) that are in addition and/or alternative(s) to the aforementioned circuits 120, 121, 122, 123. Such other circuits (not shown) may provide the means for performing any one or more of the functions, methods, operations, processes, features and/or aspects described herein with reference to the apparatus.

The computer-readable medium 106 includes various computer executable instructions. The computer-executable instructions may be executed by various hardware components (e.g., processor 104, or any one or more of its circuits 120, 121, 122, 123) of the UE 102. The instructions may be a part of various software programs and/or software modules. The computer-readable medium 106 may include roam detection instructions 140, storage instructions 141, system acquisition instructions 142, control instructions 143, and/or other instructions (not shown). Generally, the roam detection instructions 140, the storage instructions 141, the system acquisition instructions 142, the control instructions 143, and/or the other instructions (not shown) may, individually or collectively, be configured for performing and/or enabling any one or more of the functions, methods, operations, processes, features and/or aspects described herein with reference to an apparatus.

The roam detection instructions 140 include computer-executable instructions configured for detecting roaming from the coverage area associated with the first PLMN supporting hybrid voice and data to the coverage area associated with the second PLMN without support for hybrid voice and data. The storage instructions 141 include computer-executable instructions configured for storing, in response to the detection, data corresponding to the second PLMN such that the second PLMN is the RPLMN. The system acquisition instructions 142 include computer-executable instructions configured for initiating system acquisition, wherein system acquisition may include searching for the RPLMN prior to searching for any other PLMN.

In some configurations, the control instructions 143 include computer-executable instructions configured for comparing information associated with the second PLMN with stored information associated with PLMNs that support hybrid voice and data. In such configurations, the control instructions 143 also include computer-executable instructions configured for determining that the second PLMN is without support for hybrid voice and data when the information associated with the second PLMN does not match the stored information associated with the PLMNs that support hybrid voice and data. In some configurations, the control instructions 143 also include computer-executable instructions configured for switching communication from hybrid voice and data to CSFB after determining that the second PLMN is without support for hybrid voice and data.

The foregoing description provides a non-limiting example of the computer-readable medium 106 of the UE 102. Although various computer-executable instructions (e.g., computer-executable code) have been described above, one of ordinary skill in the art will understand that the computer-readable medium 106 may also include various other instructions (not shown) that are in addition and/or alternative(s) to the aforementioned computer-executable instructions 140, 141, 142, 143. Such other instructions (not shown) may include computer-executable instructions configured for performing any one or more of the functions, methods, processes, operations, features and/or aspects described herein with reference to an apparatus.

The memory 114 may include various memory modules. The memory modules may be configured to store, and have read therefrom, various values and/or information by the processor 104, or any of the aforementioned circuits 120, 121, 122, 123. The memory modules may also be configured to store, and have read therefrom, various values and/or information upon execution of the computer-executable code included in the computer-readable medium 106, or any of the aforementioned computer-executable instructions 140, 141, 142, 143.

As described above, the storage circuit 121 and/or the storage instructions 141 provide for storing certain data corresponding to the second PLMN. Such data may include system information associated with the second PLMN and is described in greater detail below. In some configurations, such data is stored in the Subscriber Identity Module (SIM) module 130 of the memory 114. However, one of ordinary skill in the art will understand that such information may additionally or alternatively be stored in various other components without deviating from the scope of the present disclosure.

As also described above, the control circuit 123 and/or the control instructions 143 provide for comparing information associated with the second PLMN with stored information associated with PLMNs that support hybrid voice and data. In some configurations, the information associated with the second PLMN is the Mobile Country Code (MCC) associated with the second PLMN, and the information associated with the PLMNs that support hybrid voice and data is a list of MCCs. Such information may be stored in the MCC module 132 of the memory 114. However, one of ordinary skill in the art will understand that such information may additionally or alternatively be stored in various other components without deviating from the scope of the present disclosure.

One of ordinary skill in the art will also understand that the UE 102 may include alternative and/or additional elements without deviating from the scope of the present disclosure. In accordance with some aspects of the present disclosure, an element, or any portion of an element, or any combination of elements may be implemented with a UE 102 that includes one or more processors 104. Examples of the one or more processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The UE 102 may be implemented with a bus architecture, represented generally by the bus 103 and bus interface 108. The bus 103 may include any number of interconnecting buses and bridges depending on the specific application of the UE 102 and the overall design constraints. The bus 103 may link together various circuits including the one or more processors 104, the memory 114, and the computer-readable media 106. The bus 103 may also link various other circuits, such as timing sources, peripherals, voltage regulators, and power management circuits, which are well known in the art.

The one or more processors 104 may be responsible for managing the bus 103 and general processing, including the execution of software stored on the computer-readable medium 106. The software, when executed by the one or more processors 104, causes the UE 102 to perform the various functions described below for any one or more apparatuses. The computer-readable medium 106 may also be used for storing data that is manipulated by the one or more processors 104 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 106 may also include, by way of example, a carrier wave, a transmission line, and any other suitable medium for transmitting software and/or instructions that may be accessed and read by a computer. The computer-readable medium 106 may reside in the UE 102, external to the UE 102, or distributed across multiple entities including the UE 102. The computer-readable medium 106 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 2:
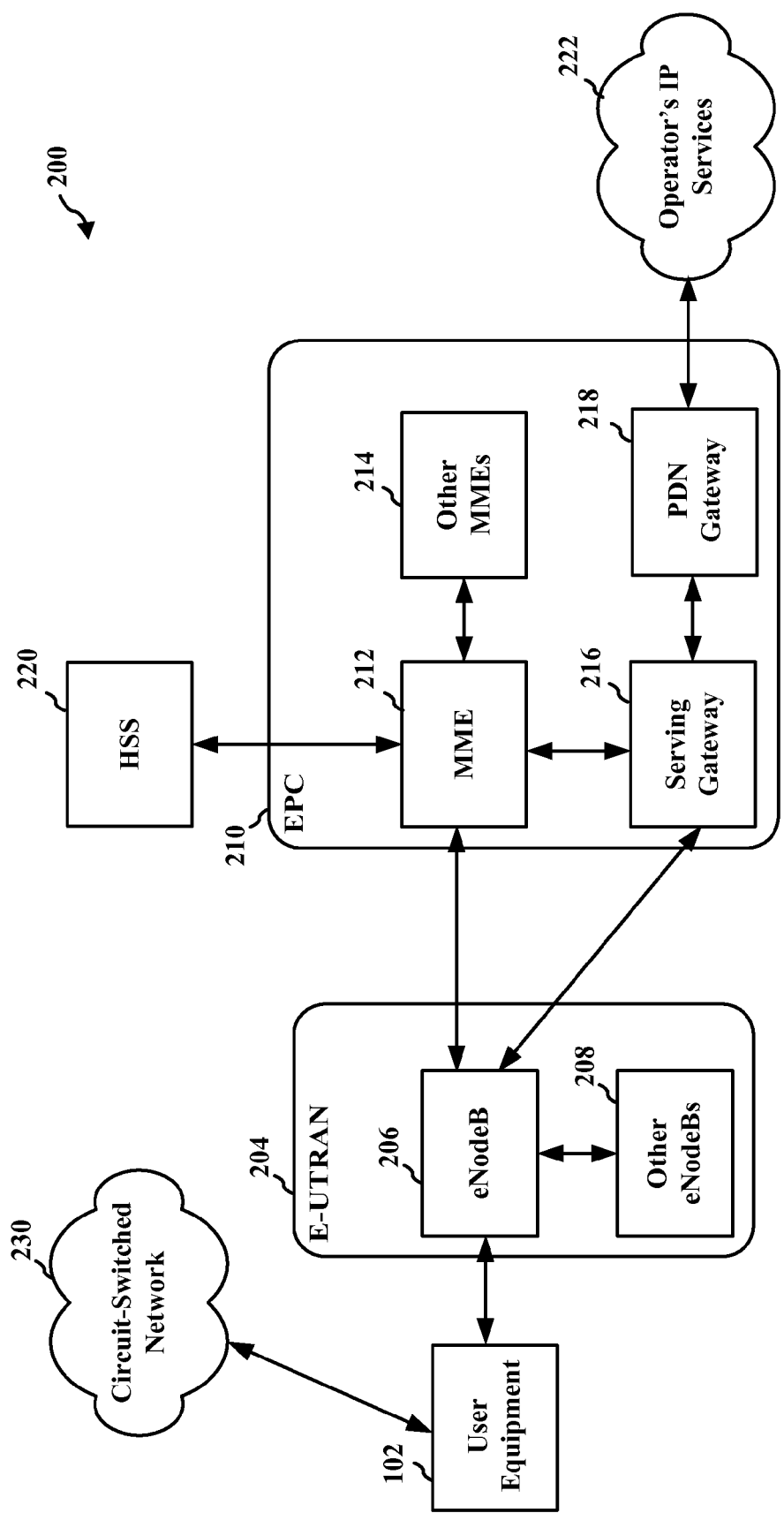
FIG. 2 is a diagram illustrating an example of a network architecture.

FIG. 2 is a diagram 200 illustrating a network architecture employing various apparatuses. A non-limiting example of such a network architecture is an LTE network architecture. The LTE network architecture may sometimes be referred to as an Evolved Packet System (EPS). The EPS may include one or more user UEs 102, an Evolved Universal Mobile Telecommunications System (UMTS) Terrestrial Radio Access Network (E-UTRAN) 204, an Evolved Packet Core (EPC) 210, a Home Subscriber Server (HSS) 220, and an Operator's Internet Protocol (IP) Services 222. The EPS can interconnect with other access networks, but for simplicity those entities/interfaces are not shown.

The EPS provides packet-switched services; however, as those skilled in the art will readily appreciate, various concepts presented throughout this disclosure may be extended to networks providing circuit-switched services. For example, as illustrated in FIG. 2, the UE 102 is being capable of utilizing a communication link to a circuit-switched (CS) network 230. In some configurations, the UE 102 may communicate with the CS network 230 separately from its communication with the evolved node B (eNB) 206. In some other configurations, the serving eNB 206 may be capable of communicating with the CS network 230 on behalf of the UE 102. The CS network may utilize any suitable protocol or communication standard capable of circuit-switched communication, including but not limited to a UMTS network utilizing W-CDMA, TD-SCDMA or any other air interface; a 3GPP2 network such as cdma2000 1x; an IEEE 802.16 WiMAX network; or any other suitable network or combination of networks. The actual wireless communication standard and the multiple access technology employed will depend on the specific application and the overall design constraints imposed on the system.

The E-UTRAN 204 includes the evolved Node B (eNB) 206 and other eNBs 208. The eNB 206 provides user and control plane protocol terminations toward the UE 102. The eNB 206 may be connected to the other eNBs 208 via an X2 interface (e.g., a backhaul). The eNB 206 may also be referred to by those skilled in the art as a base station (BS), a base transceiver station, a radio base station, a radio transceiver, a transceiver function, a basic service set (BSS), an extended service set (ESS), or some other suitable terminology. The eNB 206 provides an access point to the EPC 210 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes an Mobility Management Entity (MME) 212, other MMEs 214, a Serving Gateway 216, and a Packet Data Network (PDN) Gateway 218. The MME 212 is the control node that processes the signaling between the UE 102 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 includes the Internet, the Intranet, an IP Multimedia Subsystem (IMS), and a packet-switched (PS) Streaming Service (PSS).

For voice communication, the UE 102 may utilize any one or more of several schemes. For example, voice may be packetized and communicated via the EPS by way of the IMS. As another example, voice communication may utilize circuit-switched channels by way of the CS network 230. Depending on which network operator the UE 102 is communicating with, different schemes for CS voice communication may be utilized. Various non-limiting examples various communication types, schemes, modes, operations, methods, and/or processes are described in greater detail below (e.g., with reference to FIG. 5) and therefore will not be repeated here.

Figure 3:
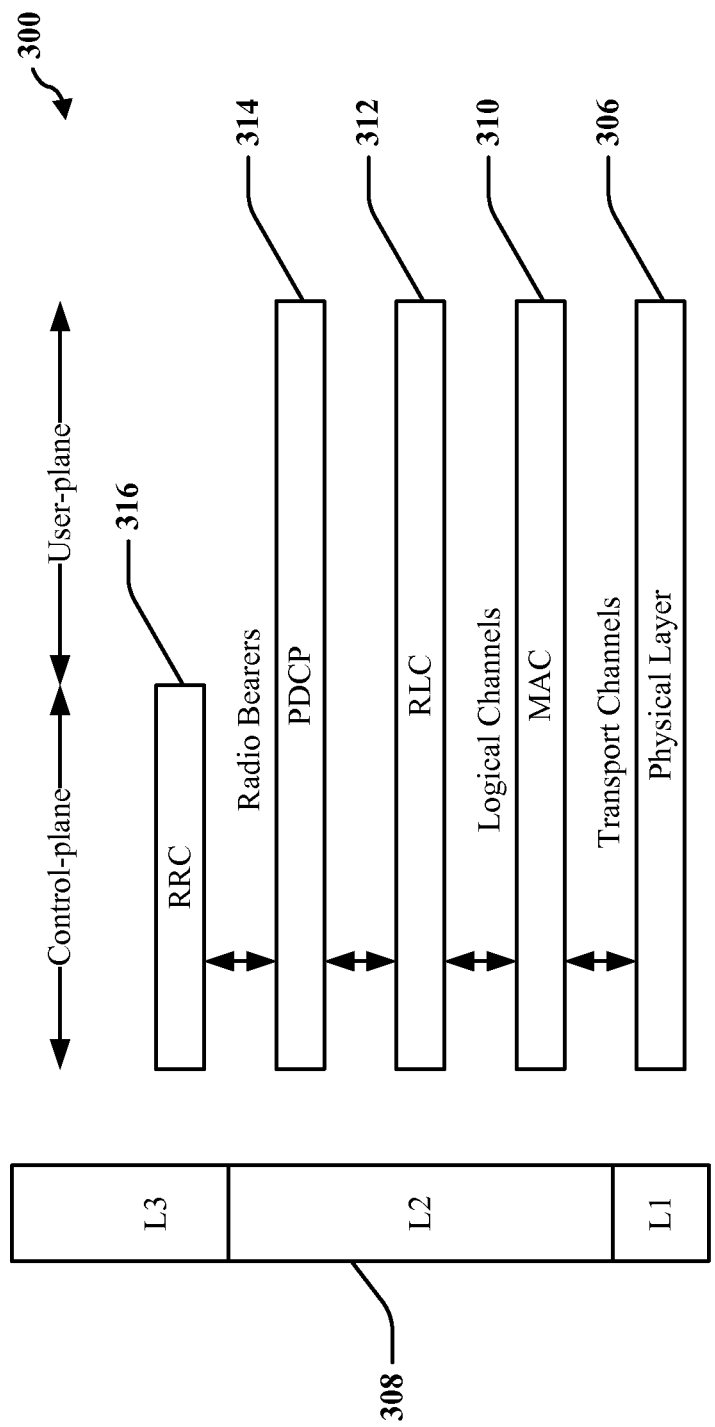
FIG. 3 is a diagram illustrating an example of a radio protocol architecture.

The radio protocol architecture may take on various forms depending on the particular application. An example for an LTE system will now be presented with reference to FIG. 3. FIG. 3 is a diagram 300 illustrating an example of the radio protocol architecture for the user and control planes. The radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 306. Layer 2 (L2 layer) 308 is above the physical layer 306 and is responsible for the link between the UE and eNB over the physical layer 306.

In the user plane, the L2 layer 308 includes a media access control (MAC) sublayer 310, a radio link control (RLC) sublayer 312, and a packet data convergence protocol (PDCP) 314 sublayer, which are terminated at the eNB on the network side. Although not shown, the UE may have several upper layers above the L2 layer 308 including a network layer (e.g., IP layer) that is terminated at the PDN gateway 218 (see FIG. 2) on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between eNBs. The RLC sublayer 312 provides segmentation and reassembly of upper layer data packets, retransmission of lost data packets, and reordering of data packets to compensate for out-of-order reception due to hybrid automatic repeat request (HARQ). The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

In the control plane, the radio protocol architecture for the UE 102 and eNB 206 is substantially the same for the physical layer 306 and the L2 layer 308 with the exception that there is no header compression function for the control plane. The control plane also includes a radio resource control (RRC) sublayer 316 in Layer 3. The RRC sublayer 316 is responsible for obtaining radio resources (i.e., radio bearers) and for configuring the lower layers using RRC signaling between the eNB 206 and the UE 102.

Figure 4:
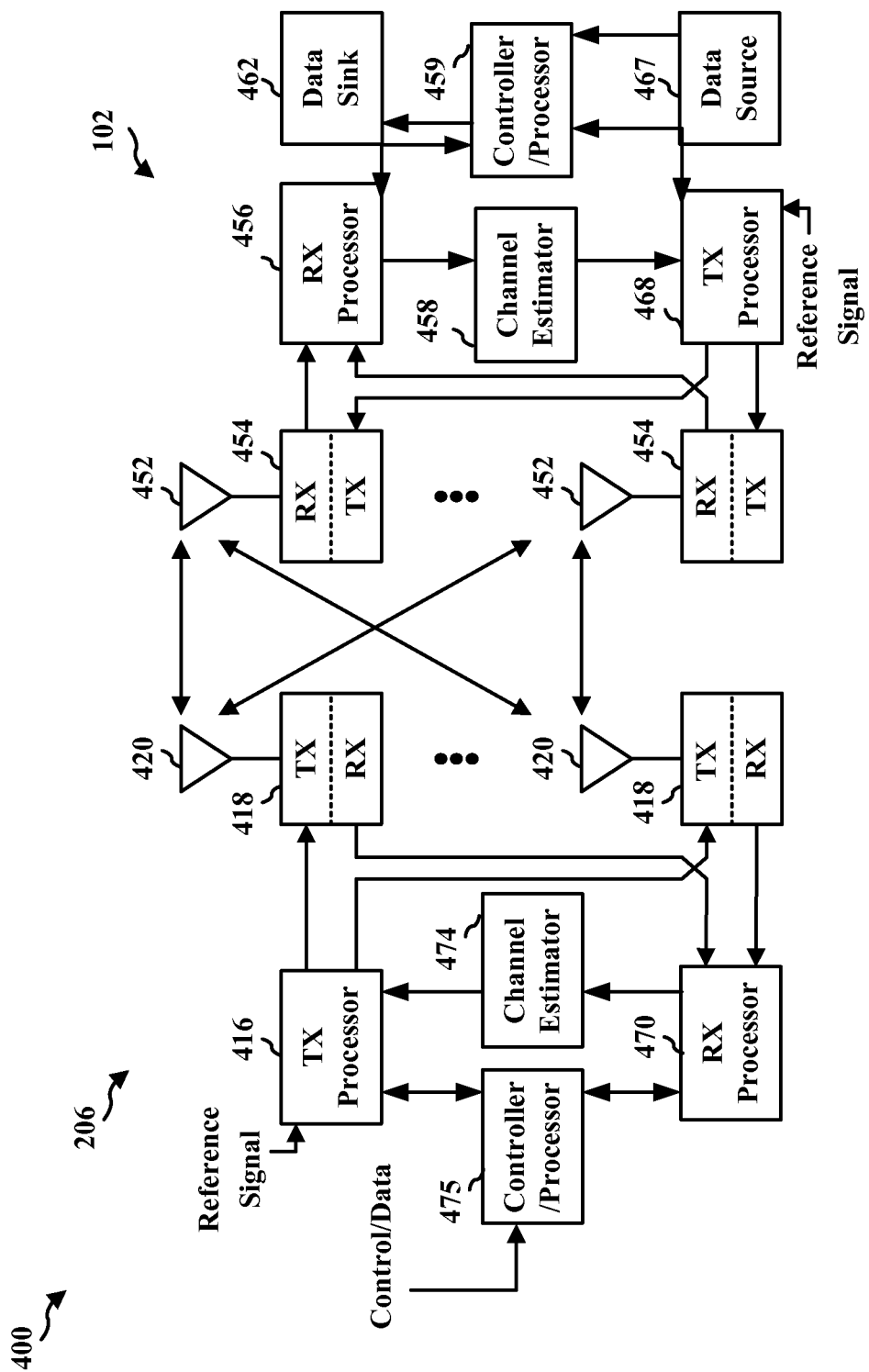
FIG. 4 is a diagram illustrating an example of a UE in communication with a network node.

FIG. 4 is a diagram 400 of the UE 102 in communication with a network node (e.g., eNB 206). In the downlink (DL), upper layer packets from the core network are provided to a controller/processor 475. The controller/processor 475 implements the functionality of the L2 layer described earlier in connection with FIG. 3. In the DL, the controller/processor 475 provides header compression, ciphering, packet segmentation and reordering, multiplexing between logical and transport channels, and radio resource allocations to the UE 102 based on various priority metrics. The controller/processor 475 is also responsible for HARQ operations, retransmission of lost packets, and signaling to the UE 102.

The TX processor 416 implements various signal processing functions for the L1 layer (i.e., physical layer). The signal processing functions includes coding and interleaving to facilitate forward error correction (FEC) at the UE 102 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 102. Each spatial stream is then provided to a different antenna 420 via a separate transmitter 418TX. Each transmitter 418TX modulates an RF carrier with a respective spatial stream for transmission. At the UE 102, each receiver 454RX receives a signal through its respective antenna 452. Each receiver 454RX recovers information modulated onto an RF carrier and provides the information to the receiver (RX) processor 456.

The RX processor 456 implements various signal processing functions of the L1 layer. The RX processor 456 performs spatial processing on the information to recover any spatial streams destined for the UE 102. If multiple spatial streams are destined for the UE 102, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 206. These soft decisions may be based on channel estimates computed by the channel estimator 458. The soft decisions are then decoded and deinterleaved to recover the data and control signals that were originally transmitted by the eNB 206 on the physical channel. The data and control signals are then provided to the controller/processor 459.

The controller/processor 459 implements the L2 layer described earlier in connection with FIG. 3. In the UL, the control/processor 459 provides de-multiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the uplink (UL), a data source 467 is used to provide upper layer packets to the controller/processor 459. The data source 467 represents all protocol layers above the L2 layer (L2). Similar to the functionality described in connection with the DL transmission by the eNB 206, the controller/processor 459 implements the L2 layer for the user plane and the control plane by providing header compression, ciphering, packet segmentation and reordering, and multiplexing between logical and transport channels based on radio resource allocations by the eNB 206. The controller/processor 459 is also responsible for HARQ operations, retransmission of lost packets, and signaling to the eNB 206.

Channel estimates derived by a channel estimator 458 from a reference signal or feedback transmitted by the eNB 206 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX modulates an RF carrier with a respective spatial stream for transmission.

The UL transmission is processed at the eNB 206 in a manner similar to that described in connection with the receiver function at the UE 102. Each receiver 418RX receives a signal through its respective antenna 420. Each receiver 418RX recovers information modulated onto an RF carrier and provides the information to a RX processor 470. The RX processor 470 implements the L1 layer.

The controller/processor 459 implements the L2 layer described earlier in connection with FIG. 3. In the UL, the control/processor 459 provides de-multiplexing between transport and logical channels, packet reassembly, deciphering, header decompression, control signal processing to recover upper layer packets from the UE 102. Upper layer packets from the controller/processor 475 may be provided to the core network. The controller/processor 459 is also responsible for error detection using an ACK and/or NACK protocol to support HARQ operations.

Figure 5:
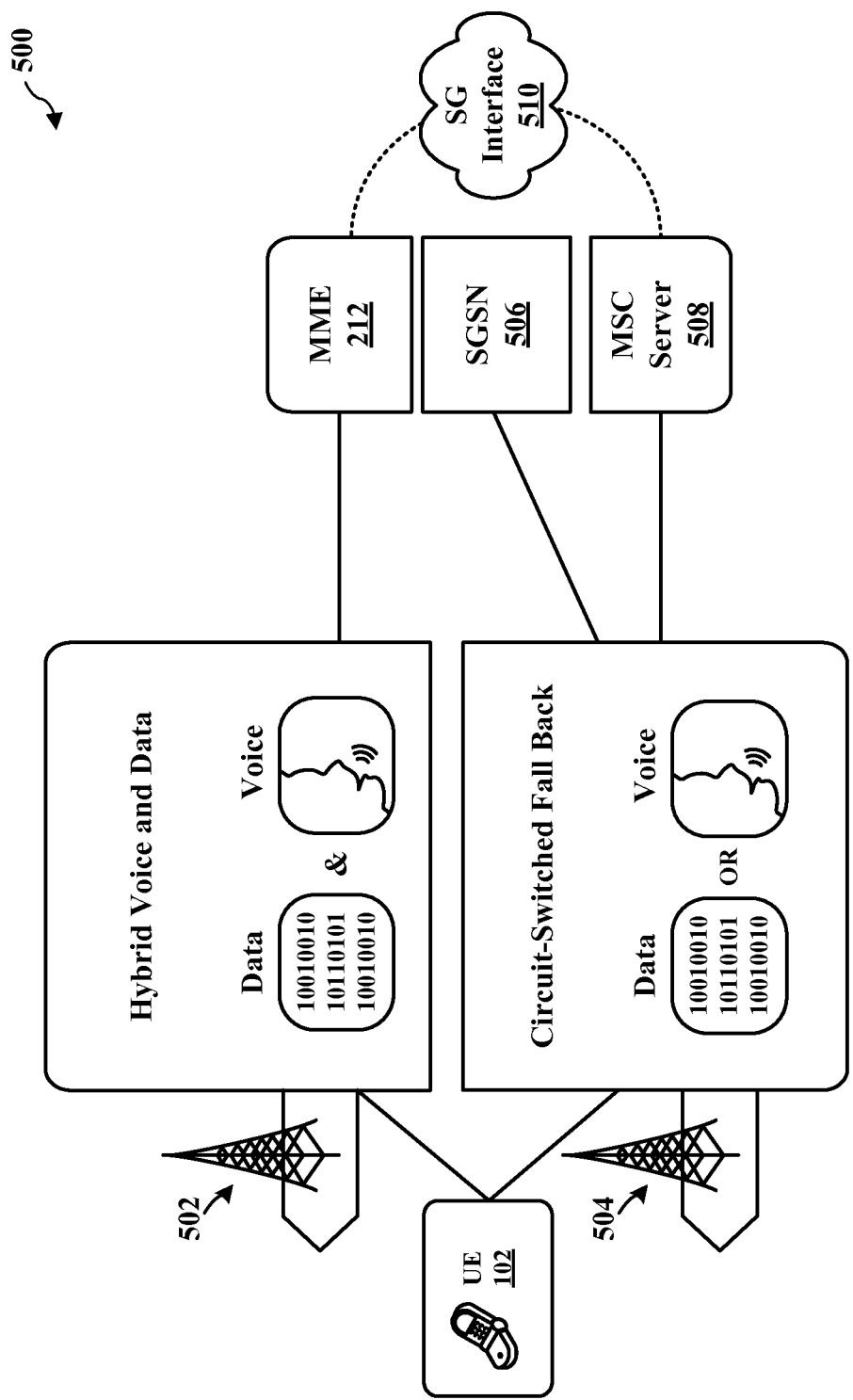
FIG. 5 is a diagram illustrating an example of various communication types.

FIG. 5 is a diagram 500 illustrating an example of the UE 102 communicating with networks supporting CSFB and/or hybrid voice and data. A first network 502 supports hybrid voice and data. (This network 502 may also support CSFB but hybrid voice and data may be preferred over CSFB because hybrid voice and data may provide a better user experience relative to CSFB.) Generally, the term 'hybrid voice and data' may refer to any technology that enables simultaneous and/or concurrent communication of voice and data. A non-limiting example of hybrid voice and data includes simultaneous voice and LTE (SVLTE) technology. With regard to SVLTE, the UE 102 may utilize two radio circuits: one for LTE communication, and the other for communication with the CS network 230. The UE 102 may be enabled to simultaneously utilize both of the radio circuits to enable the SVLTE technology. Another non-limiting example of hybrid voice and data includes single radio LTE (SRLTE). With regard to SRLTE, the UE 102 may be enabled to simultaneously communicate with the CS network 230 and the EPS utilizing a single radio circuit. SRLTE may refer to a variation of SVLTE technology. SVLTE and SRLTE, together, may sometimes be referred to as SXLTE. One of ordinary skill in the art will understand that SVLTE, SRLTE, SXLTE, and/or 'hybrid voice and data' may refer to any simultaneous voice and data technology, including both single-radio and dual-radio technologies, without deviating from the scope of the present disclosure.

If hybrid voice and data is not available to the UE 102, the UE 102 may utilize what is sometimes referred to as circuit-switched fallback (CSFB). In CSFB, the EPS is utilized for data communication. When a circuit-switched voice call is desired, the UE 102 ceases the LTE communication and 'falls back' to a 3G or other suitable circuit-switched technology for the voice call. With CSFB, data on the LTE network and voice on the 3G network are not possible simultaneously.

A second network 504 supports CSFB without providing support for hybrid voice and data. As illustrated in FIG. 5, hybrid voice and data enables communication of voice or data. In CSFB, the UE 102 is not enabled to communicate voice and data concurrently nor simultaneously. In some configurations, the UE 102 may utilize a single communication link with a circuit-switched network for communication of either voice or data. Such a communication link may not exist concurrently with another communication link that provides data or voice, respectively. In some configurations, the UE 102 may utilize a single software stack for either voice service or data service. However, in CSFB, the UE 102 may not utilize that single software stack for concurrent nor simultaneous voice and data service.

To enable hybrid voice and data, the first network 502 supporting hybrid voice and data may utilize the MME 212, which is described in greater detail above with reference to FIG. 2. To enable data services, the second network 504 may utilize a Serving General Packet Radio Service (GPRS) Support Node (SGSN) 506. To enable voice services, the second network 504 may utilize a Mobile Switching Center (MSC) server 508. The MSC server 508 may connect to the carrier's telephony network. To support CSFB signaling and Short Message Service (SMS) transfer for the UE 102, the MME 212 may connect to the MSC server 508. An SG interface 510 between the MSC server 508 and the MME 212 may enable the UE 102 to be both CS-registered and PS-registered while on the first network 502. The SG interface 510 may be a reference point between the MME 212 and MSC server 508. The SG interface 510 may used for the mobility management and paging procedures between PS domain and the CS domain. Paging messages may be exchanged via the SG interface 510. Such paging messages may initiate the transition from hybrid voice and data to CSFB. Such paging messages may also initiate the transition from CSFB to hybrid voice and data.

As described in greater detail above, hybrid voice and data allows for simultaneous and/or concurrent communication of voice and data. In some configurations, the UE 102 may utilize a first communication link with a packet-switched network for communication of data, and the UE 102 may utilize a second communication link with a circuit-switched network for communication of data. The first communication link may exist concurrently and/or simultaneously with the second communication link. In other words, the second communication link may be a concurrent second communication link with the first communication link. Generally, a communication link may refer to a communication channel or path that connects two or more communicating devices. The communication link may provide one of many information transmission paths such as those of terrestrial radio communications. Without deviating from the scope of the present disclosure, the communication link may have various characteristics, such as point-to-point, broadcast, multipoint, point-to-multipoint, uplink, downlink, forward link, reverse link, or any other suitable characteristic(s). In some configurations, the UE 102 may utilize a first software stack for circuit-switched communication, such as voice service, and utilize a second software stack for packet-switched communication, such as data service. The first software stack may be utilized concurrently and/or simultaneously with the utilization of the second software stack. Generally, a software stack may refer to a series of protocols, codes, and/or instructions that can be implemented or executed by a processor of an apparatus (e.g., the UE 102) to enable one or more functions, operations, aspects, and/or features. The software stack may sometimes be referred to as a protocol stack, or any other suitable term, without deviating from the scope of the present disclosure.

Figure 6:
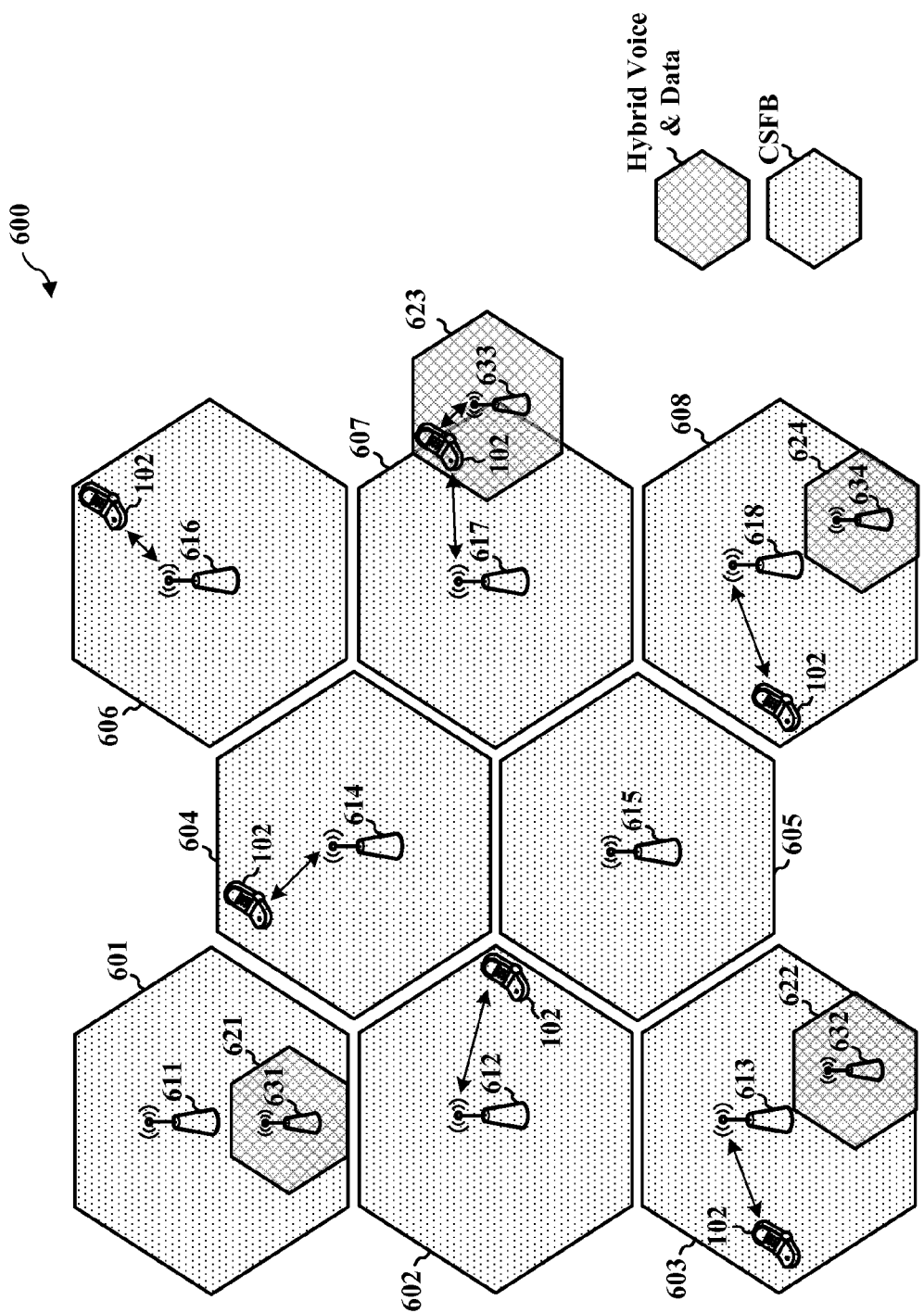
FIG. 6 is a diagram illustrating a first example of a UE in various coverage areas.

FIG. 6 is a diagram 600 illustrating an example of coverage areas 601-608, 621-624 associated with various networks. Such coverage areas 601-608, 621-624 may sometimes be referred to as cellular regions or cells. Generally, a coverage area refers to a particular geographic region or boundary within which a transmitter may communicate with a receiver. Although the shapes of the coverage areas 601-608, 621-624 illustrated in FIG. 6 may appear to be relatively homogenous (e.g., hexagonal in shape), one of ordinary skill in the art will understand that the actual shapes of the coverage areas 601-608, 621-624 may vary based on terrain, obstructions, and/or other various factors without deviating from the scope of the present disclosure. In the example illustrated in FIG. 6, each coverage area 601-608, 621-624 defines the boundaries of a particular network node 611-618, 631-634, respectively. When the UE 102 is located within the coverage area 601-608, 621-624 of the respective network node 611-618, 631-634, the network node 611-618, 631-634 may communicate with the UE 102. The network nodes 611-618, 631-634 may refer to base stations, femto cells, home eNBs, pico cells, micro cells, macro eNB, low-power class eNBs, high-power class eNBs, and/or any other suitable apparatus configured for communication with the UE 102. The network nodes 611-618, 631-634 may be configured to provide access point to the EPC 210 and/or CS network 230 for the UEs 102 within its respective coverage area 601-608, 621-624. The network nodes 611-618, 631-634 described herein may be associated with the networks 502, 504 also described herein. For example, some network nodes 631-634 may be associated with the first network 502 (e.g., a network supporting hybrid voice and data), and some other network nodes 611-618 may be associated with the second network 504 (e.g., a network supporting CSFB without supporting hybrid voice and data). In some circumstances, the coverage areas of some network node(s) may overlap with the coverage areas of some other network node(s). For example, the coverage area 623 of a first network node 633 supporting hybrid voice and data may overlap with the coverage area 607 of a second network node 617 supporting CSFB without supporting hybrid voice and data. When the UE 102 is within both of the coverage areas 607, 623, the UE 102 may communicate with either or both of the network nodes 617, 633.

The UE 102 may roam from one location to another location. Generally, roaming may refer to any change in the coverage area associated with the UE 102 such that the UE 102 alters its selection of the network and/or network node with which it communicates. For example, the UE 102 may be physically moved by the user while walking, running, driving, flight, or any other suitable type of movement.

However, one of ordinary skill in the art will understand that physical movement of the UE 102 is not a requirement of roaming. As mentioned above, roaming may refer to any change in the coverage area associated with the UE 102 such that the UE 102 alters its selection of the network and/or network node with which it communicates. For example, in some circumstances, even if the UE 102 is unmoved, the network and/or network node 633 may unexpectedly become inoperable and thus unable to communicate with the UE 102. In such circumstances, the coverage area 623 of the network node 633 may no longer exist. This is a non-limiting example of a change in the coverage area associated with the UE 102. Because the coverage area 623 of the network node 633 may no longer exist, the UE 102 may alter its selection of the network node with which it communicates. For example, the UE 102 may change its selection from a first network node 633 to a second network node 617. The network nodes 611-618, 631-634 may provide access to various types of networks, including networks the utilize technologies associated with 3G, 4G/LTE, 5G, and/or any other suitable communication protocol and/or standard.

Figure 7:
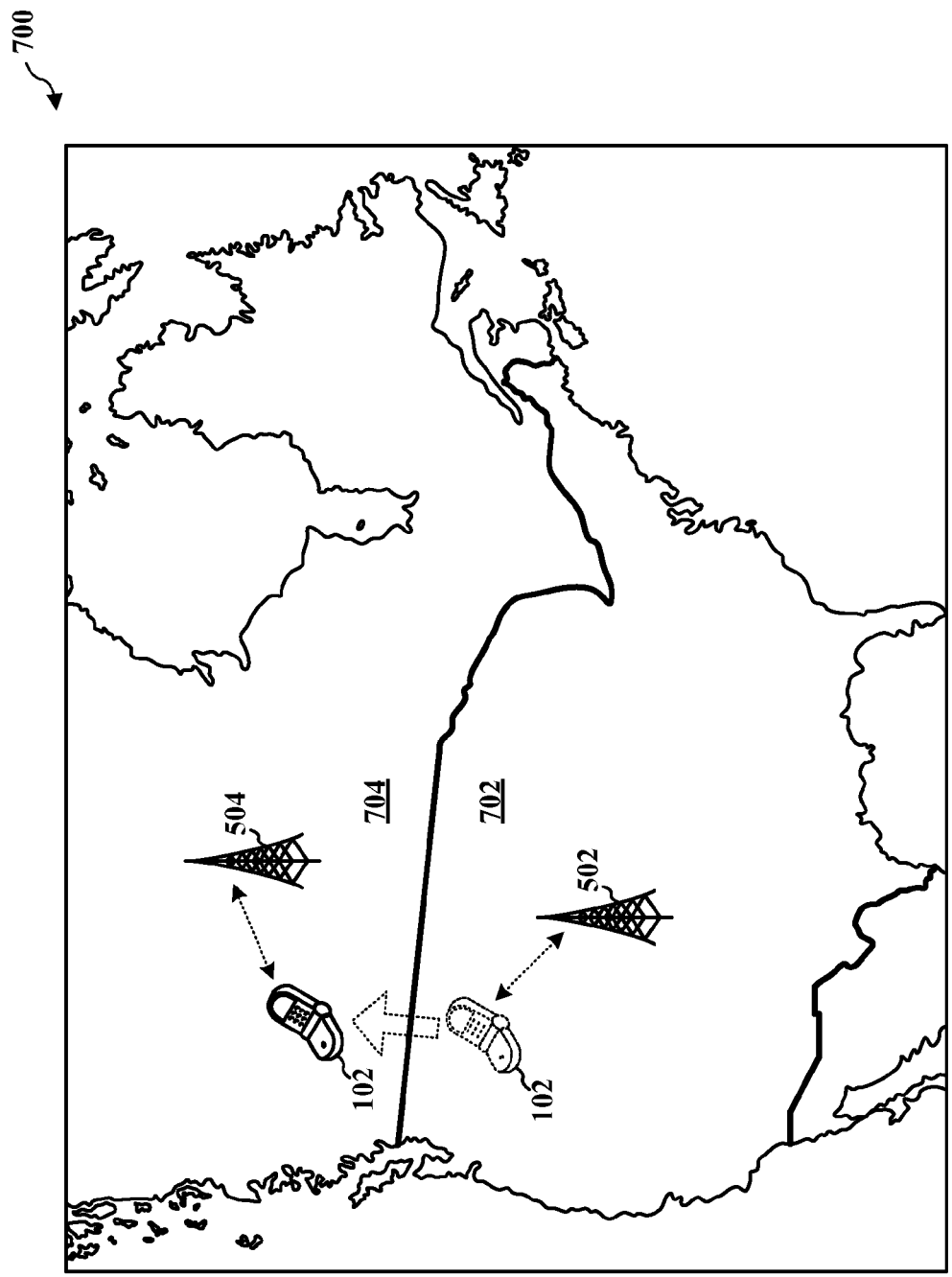
FIG. 7 is a diagram illustrating a second example of a UE in various coverage areas.

FIG. 7 is a diagram 700 illustrating an example of the UE 102 roaming from the coverage area associated with the first network 502 to a coverage area associated with the second network 504. A non-limiting example of a network (e.g., network(s) 502, 504) is a public land mobile network (PLMN). Generally, a PLMN is a type of network that is established and/or operated by an administration or Recognized Operating Agency (ROA) for the purpose of providing land mobile telecommunication services to the public. A PLMN may provide communication services to the UE 102. A PLMN may provide service in one or more frequency bands. A PLMN may be limited or bounded by the borders of a country. For example, the UE 102 may subscribe to services provided by an operator known as Verizon®. In the United States, Verizon® may have one or more PLMNs that support hybrid voice and data. If subscribed to Verizon®, the UE 102 can utilize hybrid voice and data while roaming in the United States. However, in Canada, operators may not have PLMNs that support hybrid voice and data. Accordingly, the UE 102 may not be able to utilize hybrid voice and data while roaming in Canada and, accordingly, may have to utilize CSFB. A country may have one or more PLMNs. A PLMN may be identified by the MCC and/or the Mobile Network Code (MNC). Each operator providing mobile services may have its own PLMN. One PLMN may interconnect with one or more other PLMNs, one or more Public Switched Telephone Networks (PSTNs) for telephone communications, and/or one or more Internet Service Providers (ISPs) for data and internet access. Access to the PLMN may be provided via an air interface between various apparatuses (e.g., UE 102) and various network nodes (e.g., one or more of the network nodes 611-618, 631-634 described above with reference to FIG. 6).

The coverage area associated with the first network 502 (e.g., first PLMN) may be limited to the boundaries of a first country 702. The first network 502 (e.g., first PLMN) may provide support for hybrid voice and data. (This network 502 may also support CSFB, but hybrid voice and data may be preferred over CSFB because hybrid voice and data may provide a better user experience relative to CSFB.) The coverage area associated with the second network 504 (e.g., second PLMN) may be limited to the boundaries of a second country 704 (that is different from the first country 702). The second network 504 (e.g., second PLMN) may not provide support for hybrid voice and data. However, the second network 504 (e.g., second PLMN) may provide support for other technologies, such as CSFB. As illustrated in FIG. 7, the UE 102 may roam from the coverage area associated with the first network 502 (e.g., first PLMN) to a second network 504 (e.g., second PLMN). In other words, the UE 102 may roam from a first coverage area that supports hybrid voice and data to a second coverage area that does not support hybrid voice and data (but does support CSFB).

After the UE 102 roams from a first coverage area that supports hybrid voice and data to a second coverage area that does not support hybrid voice and data (but does support CSFB), the UE 102 initiates system acquisition. Generally, system acquisition refers to a set of communication protocols implemented or utilized by the UE 102 for establishing a communication session with a particular cell, base station, network node, network (e.g., PLMN), etc. For example, a UE 102 initiating system acquisition to access an LTE network may follow a cell search procedure which includes a series of synchronization stages by which the UE 102 determines time and frequency parameters that are necessary for demodulating downlink signals, for transmitting with correct timing, and for acquiring critical system parameters. In LTE, such synchronization requirements may include symbol timing acquisition, carrier frequency synchronization, and sampling clock synchronization. System acquisition may also include searching for a PLMN that supports the type of communication preferred by the UE 102. As described in greater detail above, such types of communication may include (i) hybrid voice and data and (ii) CSFB, wherein hybrid voice and data is preferred over CSFB by the UE 102.

When a conventional UE roams from a first coverage area that supports hybrid voice and data to a second coverage area that does not support hybrid voice and data (but does support CSFB), the conventional UE will first search for a Home PLMN (HPLMN) before searching for any other type of PLMN. Generally, a PLMN is characterized as an HPLMN when the MCC and/or the MNC of the PLMN match the MCC and/or the MNC of the International Mobile Subscriber Identity (IMSI) stored on the SIM. In other words, a conventional UE will have the highest priority associated with the HPLMN relative to any other PLMN. Accordingly, during system acquisition, the conventional UE will first search the HPLMN before searching any other PLMN. However, in some circumstances, the conventional UE may not provide the fastest system acquisition possible. For instance, the conventional UE may roam from the coverage area associated with a first network (e.g., the HPLMN) that supports hybrid voice and data to the coverage areas of a second network (e.g., a Visited HPLMN (VPLMN), which may sometimes be referred to as a Roaming PLMN) that does not support hybrid voice and data (but does support CSFB). Generally, a VPLMN may refer to a PLMN that a UE visits after leaving its HPLMN. In such circumstances, the conventional UE will expend time and power to first search for the HPLMN, even though the conventional UE is no longer in the coverage area associated with the HPLMN. After expending time and power to search for the HPLMN, the conventional UE will terminate search for the HPLMN and, subsequently, begin searching for another PLMN (e.g., the VPLMN). Eventually, the conventional UE may succeed in system acquisition (e.g., of the VPLMN); however, the conventional UE will have needlessly expended time and power searching for the HPLMN.

In various aspects of the present disclosure, the UE 102 will not necessarily first search for the HPLMN. Firstly, the UE 102 detects roaming from the coverage area associated with the first network 502 (e.g., the HPLMN) providing coverage for hybrid voice and data to the coverage area associated with the second network (e.g., the VPLMN) that does not support hybrid voice and data (but does support CSFB). In some configurations, the UE 102 may detect that such roaming has occurred by: (i) comparing the information (e.g., an identifier, MCC, etc.) associated with the VPLMN with stored information (e.g., a list of identifiers, a list of MCC, etc.) associated with PLMNs that support hybrid voice and data, and (ii) determining that the UE 102 has roamed to a PLMN that is without support for the hybrid voice and data when that information (e.g., the identifier, the MCC, etc.) associated with the VPLMN does not match the stored information (e.g., the list of identifiers, the list of MCCs, etc.) associated with PLMNs that support hybrid voice and data. The foregoing is a non-limiting example of a technique that can be utilized for detecting the aforementioned roaming One of ordinary skill in the art will understand that the UE 102 can detect such roaming utilizing various techniques without deviating from the scope of the present disclosure.

Subsequently, the UE 102 may store data corresponding to the second network 504 (e.g., the VPLMN) such that the second network (e.g., the VPLMN) is set as a Registered PLMN (RPLMN). Generally, the RPLMN may refer to a PLMN for which the UE 102 has registered or performed a registration process. A non-limiting example of such data is system information associated with the second network (e.g., the VPLMN). Such information may be stored in a memory of the UE 102 (e.g., SIM module 130 of the memory 114, as illustrated in FIG. 1). By storing system information associated with the second network (e.g., the VPLMN) in the memory of the UE 102, the UE 102 can initiate system acquisition using this information even after being powered off (e.g., turned off). Storing of data for setting the VPLMN as the RPLMN may include adjusting the priority of the RPLMN to be higher than at least one other PLMN (e.g., the HPLMN). In some configurations, the UE 102 may switch communication from hybrid voice and data to CSFB after determining that the second network (e.g., the VPLMN) is without support for hybrid voice and data.

Afterwards, the UE 102 may initiate system acquisition. According to various aspects of the present disclosure, the system acquisition includes searching for the RPLMN prior to searching for any other PLMN. In comparison to the conventional UE described in greater detail above, the UE 102 searches for the RPLMN prior to searching for any other PLMN. For example, the UE 102 does not search for the HPLMN prior to searching for the RPLMN. In other words, the UE 102 searches for the second network 504 (supporting CSFB but without support for hybrid voice and data) before searching for the first network 502 (supporting hybrid voice and data). Because the UE 102 is no longer in the coverage area associated with the first network 502 (e.g., the coverage area associated with the HPLMN), the UE 102 does not needlessly expend time and power to search for the first network 502 (e.g., the HPLMN). Instead, the UE 102 first searches for the second network 504 (e.g., the VPLMN, which has been set as the RPLMN) for which the UE 102 is in its coverage area. Accordingly, under the roaming scenario described herein, the amount of time consumed by the UE 102 to perform system acquisition is less than the amount of time consumed by a conventional UE to perform system acquisition. In other words, the UE 102 is enabled to perform faster system acquisition relative to a conventional UE in certain circumstances.

Figure 8:
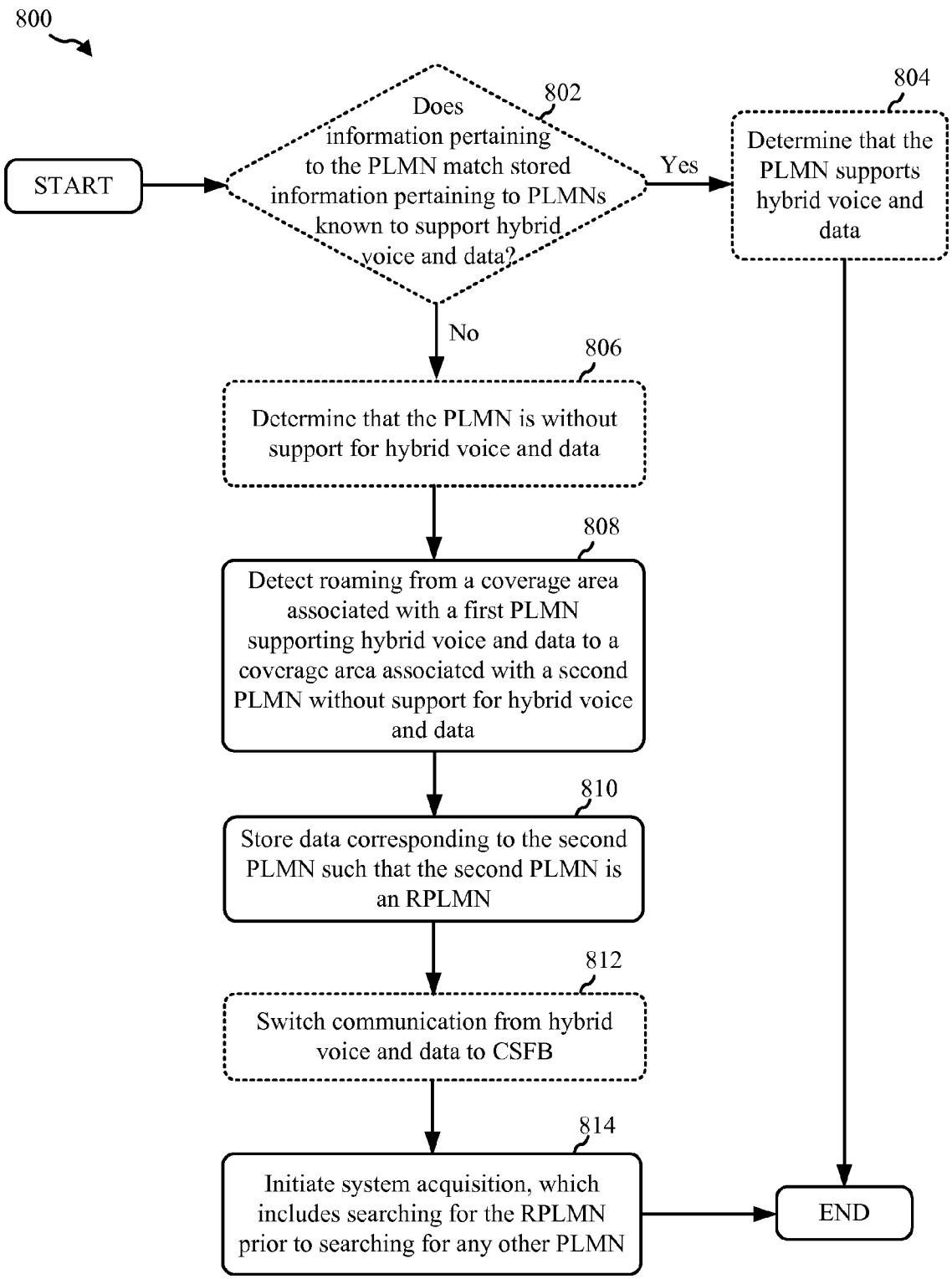
FIG. 8 is a diagram illustrating an example of various methods and/or processes operable at a UE.

FIG. 8 is a diagram 800 illustrating an example of various methods and/or processes operable at the UE 102. In some configurations, the methods and/or processes may be performed after the UE 102 is powered on (e.g., turned on). For example, referring to FIG. 7, the UE 102 may be powered on (e.g., turned on) after being moved from a first country 702 to a second country 704. In some configurations, the methods and/or processes may be performed after the UE 102 has roamed from the coverage area associated with a first PLMN to the coverage area associated with a second PLMN. For example, referring to FIG. 7, the UE 102 roams from the coverage area associated with the first network 502 (e.g., the HPLMN) to the coverage area associated with the second network 504 (e.g., the VPLMN).

At block 802, the UE 102 may compare information associated with the PLMN (e.g., a PLMN to which the UE 102 has roamed) with stored information associated with PLMNs that support hybrid voice and data. For example, the UE 102 may compare the MCC associated with the VPLMN with a list of MCCs associated with the PLMNs that support hybrid voice and data. If the information (e.g., the MCC) associated with the PLMN matches the stored information (e.g., the list of MCCs) associated with PLMNs that support hybrid voice and data, at block 804, the UE 102 determines that the PLMN supports hybrid voice and data.

Alternatively, if the information associated with the PLMN does not match the stored information associated with PLMNs that support hybrid voice and data, at block 806, the UE 102 determines that the PLMN is without support for hybrid voice and data. Accordingly, at block 808, the UE 102 detects roaming from a coverage area associated with a first PLMN supporting hybrid voice and data to a coverage area associated with a second PLMN without support for hybrid voice and data (even though the second PLMN may provide support for CSFB). For example, referring to FIG. 7, the UE 102 detects roaming from the coverage area associated with the first network 502 (e.g., the HPLMN) supporting hybrid voice and data to the coverage area associated with the second network 504 (e.g., the VPLMN) without support for hybrid voice and data.

At block 810, in response to the detection described above, the UE 102 may store data corresponding to the second PLMN such that the second PLMN is the RPLMN. An example of such information is system information associated with the second PLMN. Referring to FIG. 1, the UE 102 may store such information in the SIM module 130 of the memory 114. As described in greater detail above, the RPLMN may have a higher priority relative to other PLMNs (e.g., the HPLMN) for purposes of PLMN search.

At block 812, the UE 102 may switch communication from hybrid voice and data to CSFB after determining that the second PLMN is without support for hybrid voice and data. Because the UE 102 has determined that the second PLMN does not support hybrid voice and data, the UE 102 switches to CSFB, which is a technology that is supported by the second PLMN. Various aspects pertaining to CSFB and hybrid voice and data are described in greater detail above and therefore will not be repeated. The UE 102 may perform the switch from hybrid voice and data to CSFB utilizing various techniques without deviating from the scope of the present disclosure. For example, referring to FIG. 5, the UE 102 may utilize various signaling patterns and/or schemes involving the MME 212, SGSN 506, MSC server 508, and/or SG interface 510, which are described in greater detail above.

At block 814, the UE 102 may initiate system acquisition, wherein the system acquisition includes searching for the RPLMN prior to searching for any other PLMN. Whereas a conventional UE will have needlessly expended time and power searching for the HPLMN prior to searching any other PLMN, the UE 102 searches for the RPLMN prior to searching any other PLMN (e.g., the HPLMN). In other words, the UE 102 does not search for the HPLMN prior to searching for the RPLMN. For example, referring to FIG. 7, the UE 102 searches for the second network 504 (supporting CSFB but without support for hybrid voice and data) before searching for the first network 502 (supporting hybrid voice and data). Because the UE 102 is no longer in the coverage area associated with the first network 502 (e.g., the coverage area associated with the HPLMN), the UE 102 does not needlessly expend time and power to search for the first network 502 (e.g., the HPLMN). Instead, the UE 102 first searches for the second network 504 (e.g., the VPLMN, which has been set as the RPLMN). Accordingly, under the roaming scenario described herein, the amount of time consumed by the UE 102 to perform system acquisition is less than the amount of time consumed by a conventional UE to perform system acquisition. In other words, the UE 102 is enabled to perform faster system acquisition relative to a conventional UE in certain circumstances.

The methods and/or processes described with reference to FIG. 8 are provided for illustrative purposes and are not intended to limit the scope of the present disclosure. The methods and/or processes described with reference to FIG. 8 may be performed in sequences different from those illustrated therein without deviating from the scope of the present disclosure. Additionally, some or all of the methods and/or processes described with reference to FIG. 8 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice some aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of some aspects described throughout this disclosure that are known or later come to be that those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A method of wireless communication, the method comprising:
   detecting roaming from a coverage area associated with a first public land mobile network (PLMN) supporting hybrid voice and data into a coverage area associated with a second PLMN without support for hybrid voice and data, wherein the second PLMN is configured to support circuit-switched fallback (CSFB) operation, and wherein roaming into the coverage of the second PLMN is detected prior to initiating acquisition of the second PLMN;
   in response to the detecting, storing data corresponding to the second PLMN such that the second PLMN is a registered PLMN (RPLMN); and
   initiating system acquisition, wherein the system acquisition comprises searching for the RPLMN prior to searching for any other PLMN,
   wherein the hybrid voice and data comprises a first software stack for data services over a packet-switched network and a second software stack for voice services over a circuit-switched network concurrent with the data services, and wherein the CSFB operation comprises a third software stack for data services over the packet-switched network and for voice services over the circuit-switched network concurrent with the data services.

2. The method of claim 1, wherein the any other PLMN comprises a home PLMN (HPLMN).

3. The method of claim 1, further comprising:
   comparing information associated with the second PLMN with stored information associated with PLMNs that support hybrid voice and data; and
   determining that the second PLMN is without support for hybrid voice and data when the information associated with the second PLMN does not match the stored information associated with the PLMNs that support hybrid voice and data.

4. The method of claim 3, wherein:
 the information associated with the second PLMN comprises a mobile country code (MCC) associated with the second PLMN; and
 the information associated with PLMNs that support hybrid voice and data comprises a list of MCCs associated with the PLMNs that support hybrid voice and data.

5. The method of claim 3, further comprising:
 switching communication from hybrid voice and data to circuit-switched fallback (CSFB) after determining that the second PLMN is without support for hybrid voice and data.

6. The method of claim 5, wherein:
 the hybrid voice and data comprises a first communication link with a packet-switched network for data service and a concurrent second communication link with a circuit-switched network for voice service; and
 the CSFB comprises a single communication link with a circuit-switched network.

7. The method of claim 1, wherein:
 the coverage area associated with the first PLMN is within a first country; and
 the coverage area associated with the second PLMN is within a second country different from the first country.

8. An apparatus for wireless communication, the apparatus comprising:
 a memory;
 a transceiver; and
 at least one processor communicatively coupled to the memory and the transceiver, the at least one processor configured for:
 detecting roaming from a coverage area associated with a first public land mobile network (PLMN) supporting hybrid voice and data into a coverage area associated with a second PLMN without support for hybrid voice and data, wherein the second PLMN is configured to support circuit-switched fallback (CSFB) operation, and wherein roaming into the coverage of the second PLMN is detected prior to initiating acquisition of the second PLMN;
 in response to the detecting, storing data corresponding to the second PLMN such that the second PLMN is a registered PLMN (RPLMN); and
 initiating system acquisition, wherein the system acquisition comprises searching for the RPLMN prior to searching for any other PLMN,
 wherein the hybrid voice and data comprises a first software stack for data services over a packet-switched network and a second software stack for voice services over a circuit-switched network concurrent with the data services, and wherein the CSFB operation comprises a third software stack for data services over the packet-switched network and for voice services over the circuit-switched network concurrent with the data services.

9. The apparatus of claim 8, wherein the any other PLMN comprises a home PLMN (HPLMN).

10. The apparatus of claim 8, wherein the at least one processor is further configured for:
 comparing information associated with the second PLMN with stored information associated with PLMNs that support hybrid voice and data; and
 determining that the second PLMN is without support for hybrid voice and data when the information associated with the second PLMN does not match the stored information associated with the PLMNs that support hybrid voice and data.

11. The apparatus of claim 10, wherein:
 the information associated with the second PLMN comprises a mobile country code (MCC) associated with the second PLMN; and
 the information associated with PLMNs that support hybrid voice and data comprises a list of MCCs associated with the PLMNs that support hybrid voice and data.

12. The apparatus of claim 10, wherein the at least one processor is further configured for:
 determining to switch communication from hybrid voice and data to circuit-switched fallback (CSFB) after determining that the second PLMN is without support for hybrid voice and data.

13. The apparatus of claim 12, wherein:
 the hybrid voice and data comprises a first communication link with a packet-switched network for data service and a concurrent second communication link with a circuit-switched network for voice service; and
 the CSFB comprises a single communication link with a circuit-switched network.

14. The apparatus of claim 8, wherein:
 the coverage area associated with the first PLMN is within a first country; and
 the coverage area associated with the second PLMN is within a second country different from the first country.

15. An apparatus for wireless communication, the apparatus comprising:
 means for detecting roaming from a coverage area associated with a first public land mobile network (PLMN) supporting hybrid voice and data into a coverage area associated with a second PLMN without support for hybrid voice and data, wherein the second PLMN is configured to support circuit-switched fallback (CSFB) operation, and wherein roaming into the coverage of the second PLMN is detected prior to initiating acquisition of the second PLMN;
 means for storing, in response to the detecting, data corresponding to the second PLMN such that the second PLMN is a registered PLMN (RPLMN); and
 means for initiating system acquisition, wherein the system acquisition comprises searching for the RPLMN prior to searching for any other PLMN,
 wherein the hybrid voice and data comprises a first software stack for data services over a packet-switched network and a second software stack for voice services over a circuit-switched network concurrent with the data services, and wherein the CSFB operation comprises a third software stack for data services over the packet-switched network and for voice services over the circuit-switched network concurrent with the data services.

16. The apparatus of claim 15, wherein the any other PLMN comprises a home PLMN (HPLMN).

17. The apparatus of claim 15, further comprising:
 means for comparing information associated with the second PLMN with stored information associated with PLMNs that support hybrid voice and data; and
 means for determining that the second PLMN is without support for hybrid voice and data when the information associated with the second PLMN does not match the stored information associated with the PLMNs that support hybrid voice and data.

18. The apparatus of claim 17, further comprising:
means for switching communication from hybrid voice and data to circuit-switched fallback (CSFB) after determining that the second PLMN is without support for hybrid voice and data.

19. The apparatus of claim 18, wherein:
the hybrid voice and data comprises a first communication link with a packet-switched network for data service and a concurrent second communication link with a circuit-switched network for voice service; and
the CSFB comprises a single communication link with a circuit-switched network.

20. The apparatus of claim 15, wherein:
the coverage area associated with the first PLMN is within a first country; and
the coverage area associated with the second PLMN is within a second country different from the first country.

21. A non-transitory computer-readable medium comprising computer-executable instructions configured for:
detecting roaming from a coverage area associated with a first public land mobile network (PLMN) supporting hybrid voice and data into a coverage area associated with a second PLMN without support for hybrid voice and data, wherein the second PLMN is configured to support circuit-switched fallback (CSFB) operation, and wherein roaming into the coverage of the second PLMN is detected prior to initiating acquisition of the second PLMN;
in response to the detecting, storing data corresponding to the second PLMN such that the second PLMN is a registered PLMN (RPLMN); and
initiating system acquisition, wherein the system acquisition comprises searching for the RPLMN prior to searching for any other PLMN,
wherein the hybrid voice and data comprises a first software stack for data services over a packet-switched network and a second software stack for voice services over a circuit-switched network concurrent with the data services, and wherein the CSFB operation comprises a third software stack for data services over the packet-switched network and for voice services over the circuit-switched network concurrent with the data services.

22. The non-transitory computer-readable medium of claim 21, wherein the any other PLMN comprises a home PLMN (HPLMN).

23. The non-transitory computer-readable medium of claim 21, wherein the computer-executable instructions are further configured for:
comparing information associated with the second PLMN with stored information associated with PLMNs that support hybrid voice and data; and
determining that the second PLMN is without support for hybrid voice and data when the information associated with the second PLMN does not match the stored information associated with the PLMNs that support hybrid voice and data.

24. The non-transitory computer-readable medium of claim 21, wherein the computer-executable instructions are further configured for:
switching communication from hybrid voice and data to circuit-switched fallback (CSFB) after determining that the second PLMN is without support for hybrid voice and data.

25. The non-transitory computer-readable medium of claim 24, wherein:
the hybrid voice and data comprises a first communication link with a packet-switched network for data service and a concurrent second communication link with a circuit-switched network for voice service; and
the CSFB comprises a single communication link with a circuit-switched network.

26. The non-transitory computer-readable medium of claim 21, wherein:
the coverage area associated with the first PLMN is within a first country; and
the coverage area associated with the second PLMN is within a second country different from the first country.

* * * * *